Oct. 30, 1928.

G. W. LEWIS 1,689,837

CREAM SEPARATOR ATTACHMENT

Filed Dec. 17, 1925

Inventor
G. W. Lewis

By Clarence A. O'Brien
Attorney

Patented Oct. 30, 1928.

1,689,837

UNITED STATES PATENT OFFICE.

GROVER W. LEWIS, OF MACOMB, ILLINOIS.

CREAM-SEPARATOR ATTACHMENT.

Application filed December 17, 1925. Serial No. 76,024.

My present invention pertains to cream separators, and has for one of its objects the provision of an attachment by the use of which the cream separator may be converted into an efficient apparatus for whipping cream, beating eggs and the like.

Another object of the invention is the provision of an attachment susceptible of ready application, whereby the cream separator may be converted into a highly efficient grinder for knives and other implements.

Other objects and practical advantages of the invention will be fully understood from the following description and claim when the same are read in connection with the drawings, accompanying and forming part of this specification, in which:—

Figure 2 is a detail sectional view on an enlarged scale of the attachment for whipping cream or beating eggs or the like.

Similar numerals of reference designate corresponding parts in all of the views of the drawings.

The separator illustrated comprises a main frame 1 and a spindle 2, the said spindle being adapted to be driven from a primary driver 3 through the medium of any appropriate gearing whereby rotation of primary driver 3 will be attended by rotation of the spindle 2 at a high rate of speed. The said spindle 2 is of the type that ordinarily extends up into a cream separator bowl, and it is provided as illustrated with a shoulder or support designated by 3× and best shown in Figure 2. The upper end of the said spindle 2 is stepped as designated by 4 for the purpose of keying my novel attachment to the spindle.

Figure 1:
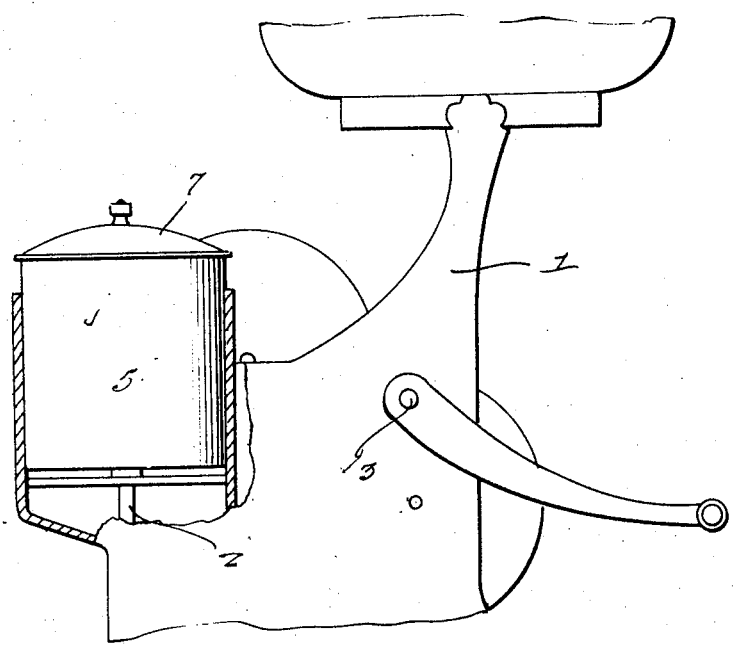
Figure 1 is a general view of a conventional cream separator such as is adapted for the employment of my novel attachment, it being understood in this connection that the separator as shown embodies the attachments for whipping cream or beating eggs without loss of any of the stock.
Figure 2:
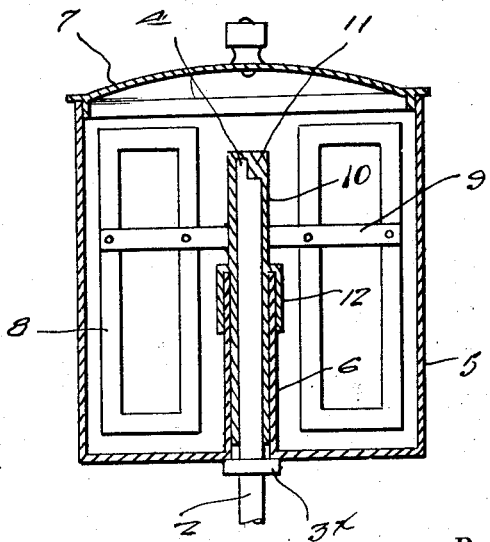

My attachment for use in the whipping of cream or the beating of eggs comprises a vessel 5 having a central tubular upright portion 6, the said vessel 5 being adapted to be superposed on the enlargement 3×, and the said sleeve 6 being designed to surround the spindle 2 with an intervening space between the two as illustrated in Figure 2. The upper end of the vessel 5 is open, and said vessel is designed to be normally closed by a removable cover 7. As shown in Figure 1, the vessel 5 is arranged in the main frame 1 and is intended to be held against turning about its axis by frictional contact between it and the main frame 1 or otherwise.

Located in the vessel 5 is the agitating rotor of the cream whipper or egg beating apparatus. The said rotor includes opposite open blades 8, arms 9 to which said blades are attached and a sleeve 10 which carries the said arms; the said sleeve interiorly constructed at its upper end 11 to cooperate with the stepped end of the spindle for the keying of the rotor to the spindle so that the rotor will be turned by the spindle. The said sleeve 10 surrounds the spindle and is arranged within the tubular portion 6 of the vessel 5 and is equipped with a cap sleeve or auxiliary sleeve 12 which surmounts and surrounds the upper portion of the tubular member 6.

Manifestly when the attachment is used for the whipping of cream or the beating of eggs or for any other analogous purpose, the high rate of speed at which the spindle 2 is driven will assure quick reduction of the cream or eggs to the state desired, and this without liability of any of the substance being lost. It will also be readily appreciated that subsequent to a use of the attachment shown in Figure 2, the said attachment may be expeditiously and easily removed from the spindle 2 so that the ordinary separator bowl may be employed in association with said spindle, or so that the spindle may be utilized for the driving of the grinding attachment shown in Figure 2.

Figure 3:
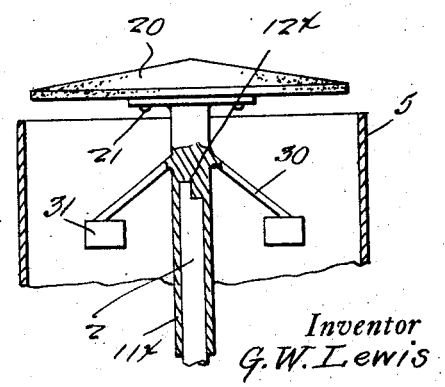
Figure 3 is a detail view partly in elevation and partly in section showing the attachment for grinding knives or other implements as properly positioned on the spindle of the separator.

When the grinding attachment shown in Figure 3 is employed, it is optional with the user to employ the vessel 5 or to altogether omit the said vessel 5.

The grinding attachment includes a sleeve 11× shaped at its upper end as designated by 12× to key it to the spindle 2. In addition to the said sleeve 11×, the grinder attachment comprises a disk 20 of emery or other appropriate abrasive material surmounting and fixedly connected to a head flange 21 on the upper end of the sleeve 11×. As illustrated the disk 20 is of inclined type but it is manifest that the said disk may within the purview of my invention be of any appropriate configuration. It will be readily understood that when the grinding attachment is relatively arranged as shown in Figure 3, and the spindle 2 is rotated at a high rate of speed, the disk 20 will operate efficiently to quickly and thoroughly grind any implement that may be presented to it.

For the sake of assuring free and easy running of the disk 20, I prefer to provide the sleeve 11× with hangers 30 directed downwardly and outwardly from the sleeve and equipped with balancing weights 31. On rotation of the sleeve 11× with the spindle 2, the said weights 31 will obviously lend momentum to the sleeve 11× and the disk 20, and in that way will assure the disk being evenly driven for continuous efficient operation.

Ordinarily a cream separator is used as such in the morning and in the evening, but under ordinary circumstances the separator throughout the major portion of a day is idle. By virtue of the provision of my novel attachment it will be appreciated, however, that during the major intermediate portion of the day, the greater part of the separator may be used either as a cream whipper or egg beater involving the use of the attachment shown in Figure 2, or may be used as a grinder involving the use of the attachment shown in Figure 3.

I have entered into a detailed description of the construction and relative arrangement of the parts embraced in the present and preferred embodiments of my invention, in order to impart an exact understanding of my novel attachments. I do not desire, however, to be understood as confining myself to the construction and relative arrangement of parts as disclosed, my invention being defined by my appended claim within the scope of which structural changes and changes in arrangement may be made without departure from my invention.

Having described my invention, what I claim and desire to secure by Letters Patent, is:—

The combination of an upright spindle having an enlargement at an intermediate point of its length and also having a stepped upper end, a vessel surrounding the spindle and superposed on said enlargement and having a bottom and a central tubular portion of circular cross section extending upwardly from the bottom and surrounded and spaced from the spindle, and a rotatable sleeve arranged on and receiving the spindle and also arranged and turnable in the said upstanding tubular portion of the vessel and extending above said tubular portion and having an upper imperforate end portion of interior stepped formation opposed to and gravitationally maintained in engagement with and keyed to the upper stepped end of the spindle and equipped with blades movable with said spindle and in the vessel and also equipped at an intermediate point in its length with an imperforate cap having a pendant skirt receiving and surrounding and turnable about the upper portion of the central tube of the vessel to prevent the escape of substance through said tube.

In testimony whereof I affix my signature.

GROVER W. LEWIS.